US008041565B1

(12) United States Patent
Bhardwaj et al.

(10) Patent No.: US 8,041,565 B1
(45) Date of Patent: Oct. 18, 2011

(54) PRECISION SPEECH TO TEXT CONVERSION

(75) Inventors: Vinod K. Bhardwaj, San Jose, CA (US); Scott England, Los Gatos, CA (US); Dean Whitlock, Bristol, TN (US)

(73) Assignee: FoneWeb, Inc., Santa Clara, CA (US)

( * ) Notice: Subject to any disclaimer, the term of this patent is extended or adjusted under 35 U.S.C. 154(b) by 997 days.

(21) Appl. No.: 11/763,943

(22) Filed: Jun. 15, 2007

Related U.S. Application Data

(60) Provisional application No. 60/927,555, filed on May 4, 2007.

(51) Int. Cl.
*G10L 15/26* (2006.01)
(52) U.S. Cl. ....................................................... 704/235
(58) Field of Classification Search .................... 704/235
See application file for complete search history.

(56) References Cited

U.S. PATENT DOCUMENTS

| 6,173,259 | B1 * | 1/2001 | Bijl et al. | 704/235 |
| 6,535,848 | B1 * | 3/2003 | Ortega et al. | 704/235 |
| 6,816,834 | B2 * | 11/2004 | Jaroker | 704/235 |
| 7,197,459 | B1 | 3/2007 | Harinarayan et al. | |
| 7,236,932 | B1 * | 6/2007 | Grajski | 704/277 |
| 2008/0255837 | A1 * | 10/2008 | Kahn et al. | 704/235 |

* cited by examiner

*Primary Examiner* — Abul K Azad
(74) *Attorney, Agent, or Firm* — Beyer Law Group LLP

(57) ABSTRACT

A speech-to-text conversion module uses a central database of user speech profiles to convert speech to text. Incoming audio information is fragmented into numerous audio fragments based upon detecting silence. The audio information is also converted to numerous text files by any number of speech engines. Each text file is then fragmented into numerous text fragments based upon the boundaries established during the audio fragmentation. Each set of text fragments from the different speech engines corresponding to a single audio fragments is then compared. The best approximation of the audio fragment is produced from the set of text fragments; a hybrid may be produced. If no agreement is reached, the audio fragment and set the text fragments are sent to human agents who verify and edit to produce a final edited text fragment that best corresponds to the audio fragment. Fragmentation that produces overlapping audio fragments requires splicing of the final text fragments to produce the output text file.

19 Claims, 7 Drawing Sheets

PRECISION SPEECH TO TEXT CONVERSION

CROSS-REFERENCE TO RELATED APPLICATIONS

This application claims priority of U.S. provisional patent application No. 60/927,555 filed May 4, 2007 which is hereby incorporated by reference.

This application is related to U.S. patent application Ser. No. 11/763,870 filed on the same date herewith, entitled "Speech Controlled Services and Devices Using Internet," which is hereby incorporated by reference.

FIELD OF THE INVENTION

The present invention relates generally to a speech-to-text conversion engine. More specifically, the present invention relates to conversion using multiple speech-to-text engines and human agents.

BACKGROUND OF THE INVENTION

Currently, speech recognition software requires that each user have a custom user profile. These user profiles are distributed in the sense that a user must have numerous user profiles if he or she uses different speech recognition software. (For example, while the DRAGON brand software from Nuance Corporation might be used on an IBM-compatible computer, it cannot be used on a computer from Apple Inc., so the user may choose the ILISTEN brand software available from MacSpeech, Inc. for use on an Apple computer.) Further, even if the user always uses a single brand of computer, his or her speech profile must be physically transported and installed on each computer (home, office, travel computer) that the user might be using.

The huge vocabulary of potential words that a user might speak also presents a problem. Speech recognition companies attempt to ameliorate this problem by providing language-specific versions of their software tailored to specific categories of users. For example, a speech recognition engine may provide versions based upon "English," "American English," "Indian English," etc., in an attempt to reduce the vocabulary required and to increase accuracy of the engine. Nevertheless, each engine may still require a vocabulary of 50,000 to 100,000 words in order to accurately convert speech to text for any potential user in a given category (in order to match any potential spoken word with a known word in the vocabulary).

Further compounding the problem is that each user of a particular brand of speech recognition software must perform training of that software for it to be accurate. At least two to three hours of training are typically required. Although certain speech engines advertise that no training is required, realistically, at least a minimal amount of training is needed otherwise accuracy suffers. It is not uncommon for a professional user of speech recognition software to spend many hours training that software in order to achieve the highest accuracy. And finally, a user or enterprise must deal with the mechanics of installing and maintaining speech recognition software that can be a great burden. The software must be selected based upon available computers, purchased, installed and maintained. Problems with computer compatibility, lack of memory, etc., are not uncommon. Many versions of installed speech recognition software are out of date (and hence less accurate) because the user or enterprise has not bothered to update the software.

Finally, once the user has selected a particular brand of speech recognition software, has installed and trained that software, there is no guarantee that the users words will be transcribed accurately. Due to pronunciation, diction, speed of delivery, cadence, voice changes due to illness, etc., the chosen speech recognition software may still produce text that has errors. Even the best software under optimal conditions can find it difficult to achieve a 95% accuracy rate. Based upon the above state of technology and the needs of individuals, a technique and speech-to-text engine is desired that would provide greater accuracy with reduced or no training.

SUMMARY OF THE INVENTION

To achieve the foregoing, and in accordance with the purpose of the present invention, a precision speech-to-text engine is disclosed.

This centralized speech service creates and maintains a user profile for each user at a central location. Because the particular speech engine used is maintained at a central location, the speech service can always make sure it is using the latest versions of the available speech engines. There is no need for a user to purchase, install or maintain a speech engine on each computer or device that the user might use. Because the speech service creates and maintains the user profile at a central location, there is no need for the user to create a profile or to spend time training that profile. Further, any hardware or software application that desires to use the speech service is provided with the assurance that the user's profile is up-to-date, accurate and is continually being improved. In this way, software developers, service providers, web sites and device manufacturers can all rely upon the speech service as providing a quality user profile.

Further, use of human agents continually improves the user's profile as a user uses the speech service to convert speech to text. Having human agents in the loop of speech conversion (at least initially) improves speech conversion because the agents can add words, correct words, create dedicated text for particular verbal expressions, and generally improve the user's profile. Speech-to-text conversion improves as a user uses the speech service. It is contemplated that an initial conversion of user speech might require substantial input from a human agent. But, as the user continues to use the speech service, and as the user's profile grows and becomes more accurate, reliance upon the human agent becomes less and less necessary until eventually all speech-to-text conversion is occurring automatically by computer without human intervention. Because a particular user's speech is only compared to his particular profile (instead of to a general vocabulary of tens of thousands of words), accuracy is approved.

Another advantage of a central speech service is that once a transcription has been performed and the transcribed text is verified or edited by humans, the resultant text is then fed back into each of the speech engines used at the central speech service so that the speech engine learns and the user's profile is expanded and improved. For example, if the speech engine marks a word with a 90% accuracy rating, yet the word is actually correct, feeding that word (in the context of the entire speech) back into the speech engine with the corresponding audio file allows the speech engine to mark that word is being 100% (or nearly 100%) accurate for that particular spoken word. These spoken words with improved accuracy ratings go into a user's personal profile and transcription improves each time a user uses the service. No training of a software speech engine is required of the user.

The result of such a central speech service with centrally located user profiles is an extremely accurate speech to text conversion service. Of course, the speech service itself may be distributed over different servers or geographic locations, yet still be viewed as a central service from the point of view of users and hardware and software developers. The present invention is thus an enabling technology for any type of hardware or software developer that desires to use speech recognition.

Processing of user speech by fragmenting the audio file and fragmenting the text files produced has advantages. Once fragmented, each audio and text fragment may be sent anywhere over the Internet to a verification and/or editing agent. Further, a single audio file may be fragmented and sent to dozens or even hundreds of agents for verification and editing. Each fragment is verified and edited by multiple agents, with different fragments being sent to different groups of agents.

Thus, the first fragment transcribed and verified may be played back to the user (using a text-to-speech engine) within seconds of that speech being received. As fragments are transcribed, each fragment is added to the queue for playback and the user has the impression that transcription is occurring in real time. By contrast, if the user were to speak for one-half hour and then that one-half hour of audio were listened to and verified without fragmentation, it would be least one-half hour before the user could hear any results played back. Further, productivity is increased because each fragment may be sent to a different location for verification, thus the fragments are verified and edited nearly in parallel by different agents at different locations. There is a trade-off associated with the size of audio fragments produced: fragments that are too small may not provide enough context for the verification and editing agents, while fragments that are too long result in a longer pipeline delay.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

U.S. patent application Ser. No. 11/368,840 filed Mar. 6, 2006 entitled "Message Transcription, Voice Query and Query Delivery System" presents techniques for converting speech to text and is hereby incorporated by reference.

Figure 1:
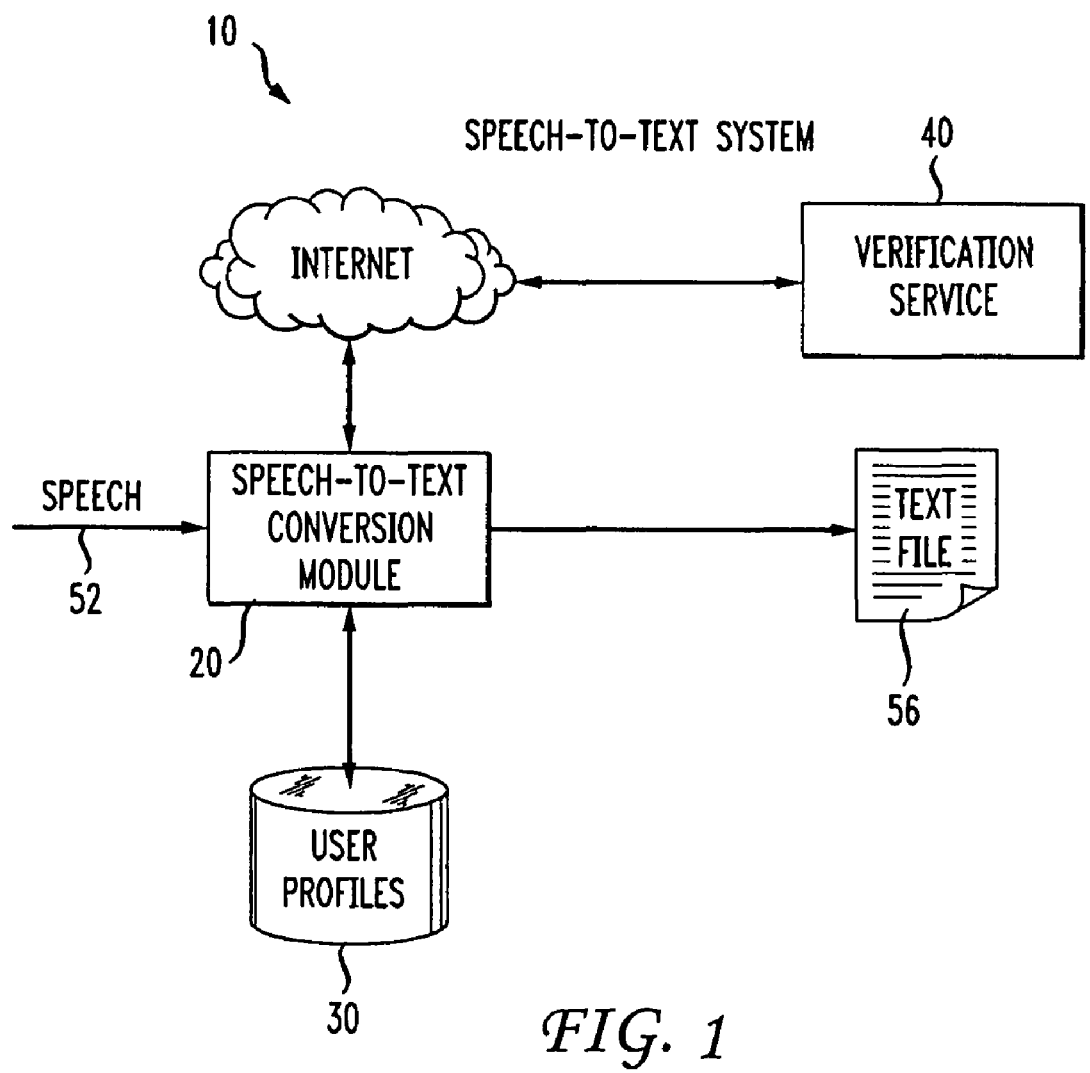
FIG. 1 illustrates a speech to text system according to one embodiment of the invention.

FIG. 1 illustrates a speech to text system 10 according to one embodiment of the invention. Included are a speech-to-text conversion module 20, a database of user profiles 30 and a verification service 40. Incoming speech 52 is converted into outgoing text 56. Conversion module 20 is implemented as described below and received speech 52 over any suitable connection or input means. In one embodiment, speech is delivered over the Internet or other communications network to a centralized speech-to-text service as described in application Ser. No. 11/368,840. In other embodiments, module 20 resides on a user's computer or within an enterprise network and speech 52 is either input to such a computer directly or is delivered over a local or wide area network. Similarly, output text 56 may be delivered to a file or display on a user's local computer, may be delivered through a local or wide area network, or may be sent back over the Internet or other communications network as described in application Ser. No. 11/368,840.

A database of user profiles 30 stores user speech profiles and may be implemented in any suitable database. Preferably, each speech engine will use a proprietary format for a user speech profile and will have its own database of user profiles.

Figure 2:
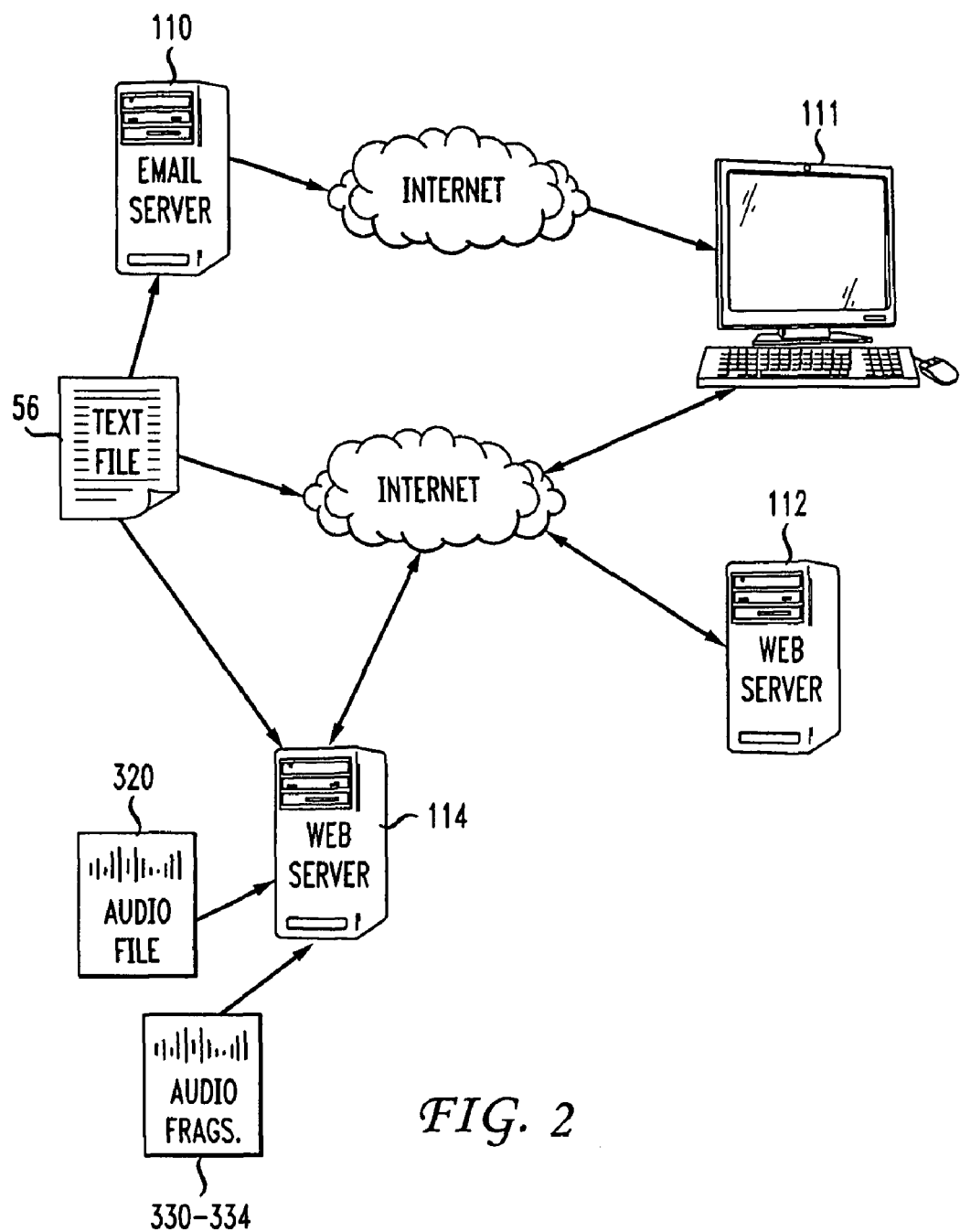
FIG. 2 illustrates a technique for making the text file and audio available to a user and is described below.

FIG. 2 illustrates a technique for making the text file and audio available to a user and is described below.

Figure 3:
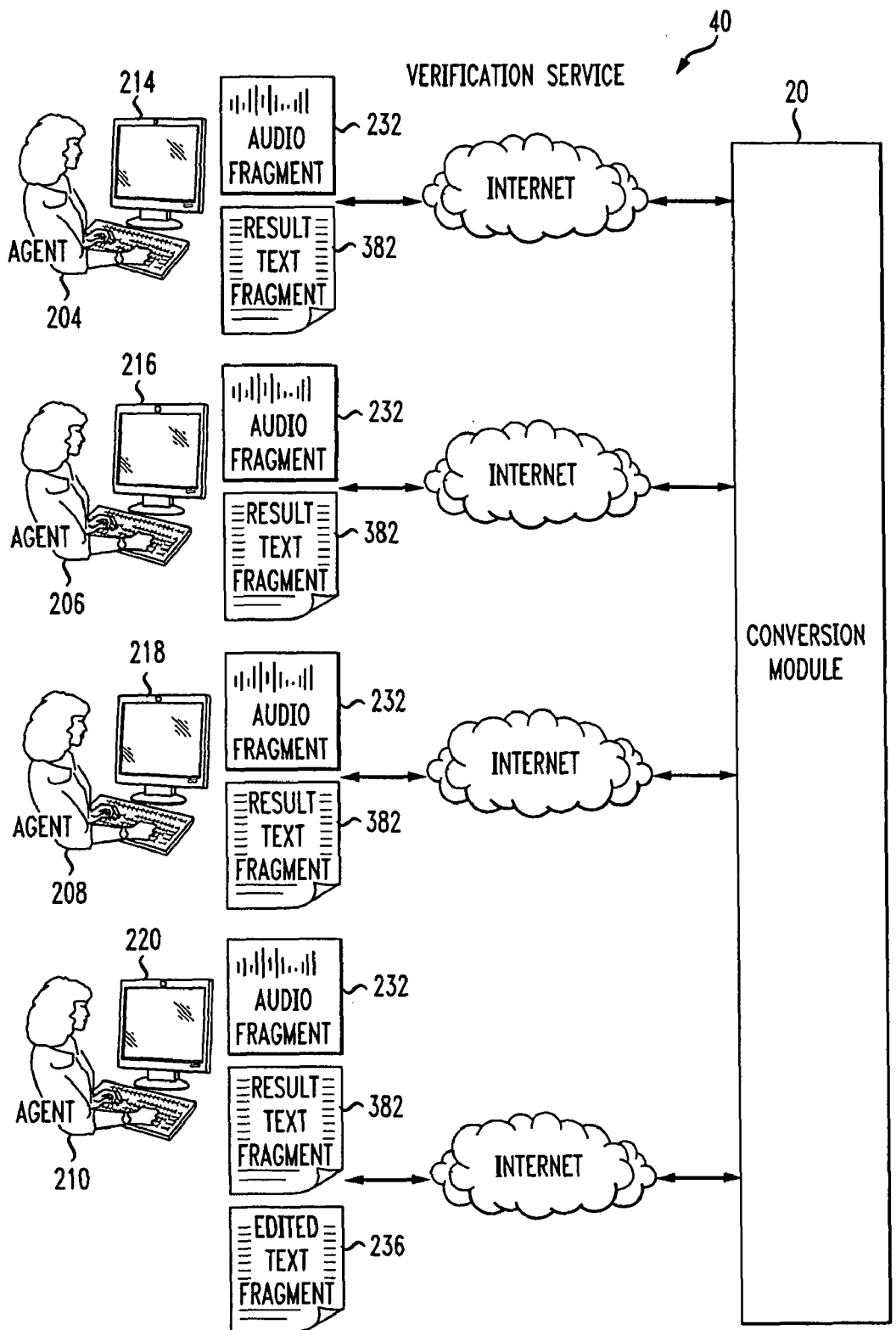
FIG. 3 illustrates a verification service.

FIG. 3 illustrates a verification service 40. The verification service is accessible by the conversion module 20 over the Internet, although communication via any suitable communications network is also possible. The verification service includes any number of agents 204-208 using computers 214-218 who double check the conversion of an audio fragment 232 into a text fragment 234. Also included is an agent 210 who is able to produce a corrected text fragment 236 based upon fragments 232 and 234. These agents may be located in a single geographic location or may be spread over a wide geographic area. Preferably, many different agents are used so that audio and text fragments for a particular audio file may be verified and edited in parallel, thus creating a pipeline of fragments that are worked on in parallel. For example, a group of three agents may be considered a cell who verify the same audio and text fragment at a time. There may be a great number of these cells, thus allowing a pipeline of fragments to be worked on in parallel.

Figure 4:
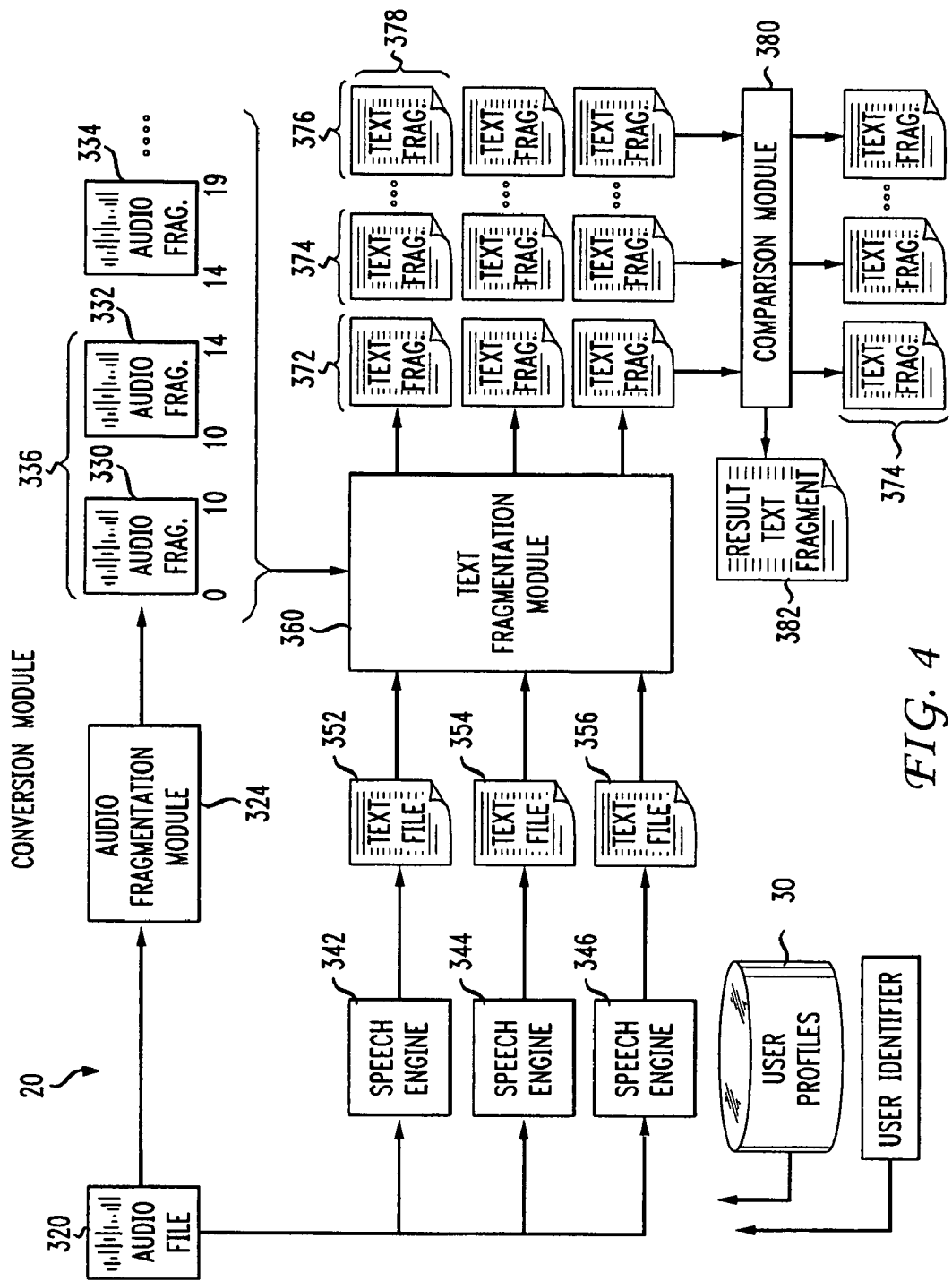
FIG. 4 illustrates in greater detail the speech-to-text conversion module of FIG. 1.

FIG. 4 illustrates in greater detail the speech-to-text conversion module 20 of FIG. 1. An audio file 320 represents in one embodiment the user speech 52 that is input to the module. Any suitable format for the audio files may be used. By way of example, the audio file is first recorded as a WAV file and then converted into MP3 format. Other formats for the audio file may be used.

Audio fragmentation module 324 is software that fragments the audio file into any number of audio fragments 330-334 including audio markers 336. In one embodiment, fragmentation module 324 implements a silence detection system that fragments the audio file into any number of smaller files based upon detecting periods of relative silence between audio fragments. Other techniques for separating the audio file into any number of audio fragments may be used.

Included with the audio fragments are audio markers 336 that identify a relative elapsed time for the beginning and end of each audio fragment. For example, fragment 330 is shown as beginning at time 0 and ending at time 10. Thus, fragment 332 begins at time 10 and ends at time 14, for example. Times are shown in seconds, but other units, scales, fractions for measurement of time may also be used (for example, indicating the beginning and end of a fragment in tenths or hundredths of a second).

Audio file 320 is also fed into speech engines 342-346. Preferably, audio file 320 is fed in parallel into fragmentation module 324 and into the speech engines. In other embodiments, the audio file may be fed into module 324 before or after the speech engines, or the audio file may be fed into the speech engines consecutively, instead of in parallel. The speech engines also receive input from user profile database 30.

Speech-to-text engines 342-346 are any number of suitable speech-to-text engines capable of translating voice or audio data spoken by an individual into accurate text. Any suitable speech recognition software may be used such as Dragon NaturallySpeaking (version 8) available from Nuance Communications Inc., ViaVoice (version 10) available from IBM, or Sphinx open source speech recognition (version 4) available from CMU. In one specific embodiment, the speech engines used are off-the-shelf engines that are customized for this particular application.

Output from each speech engine are individual text files 352-356. Text fragmentation module 360 fragments each output text file into a series of text fragments input from audio markers 336. For example, text fragments 378 represent text file 352 that has been broken into individual text fragments based upon markers 336. In other words, the first text fragment of text file 352 (identified at 372 and 378) is the actual text corresponding to audio fragment 330 lasting from the time of 0 seconds up and tell 10 seconds. Text fragments 372 in this example are three text fragments, each text fragment corresponding to audio fragment 330 and each text fragment representing conversion using one of speech engines 342-346.

All text fragments 372-376 are input into comparison module 380 for comparison. Output from the comparison module are indications as to whether the text fragments match or need further analysis.

Figure 5:
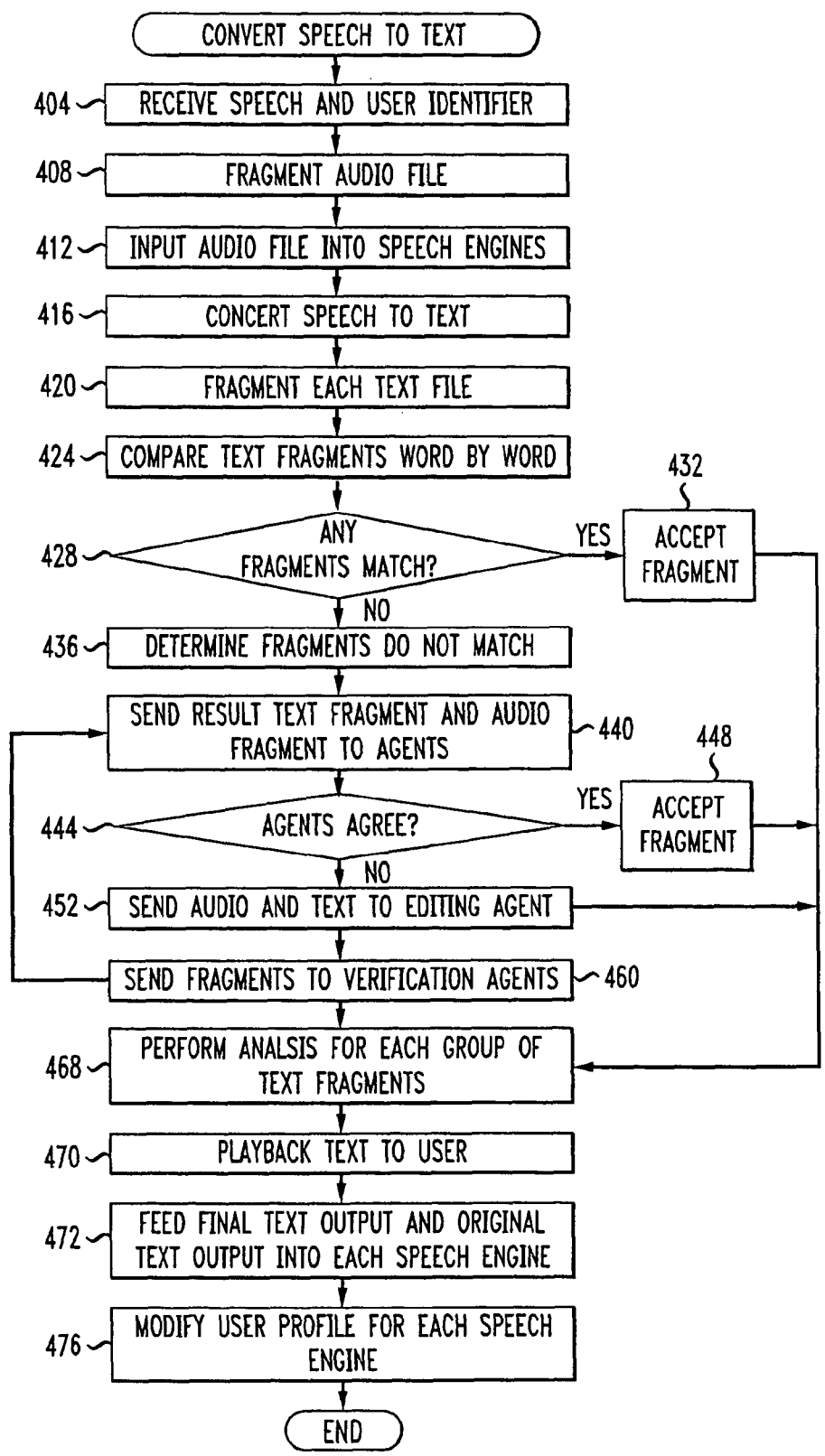
FIG. 5 is a flow diagram describing one embodiment for converting speech into text.

FIG. 5 is a flow diagram describing one embodiment for converting speech into text. In step 404 any type of recorded speech is received at conversion module 20 along with an identification of the speaker. The speech may be a word, phrase, sentence or speech of minutes or even hours in length. The speech may be received over any suitable communications medium such as by telephone, Internet, wireless network, local area network, wide area network, etc. The speech is preferably received in an audio file but other formats are also acceptable. A user identifier is also received to facilitate retrieval of the user profile from database 30. A user identifier may be obtained by analyzing the user's spoken name or unique word or phrase, by identifying the user by a voice print or other sound frequency analysis, by receiving input from a telephone keypad or information input on a computer, by receiving an SMS message, by using a caller identification service, by deriving an identifier from a telephone number used by the user, by using the user's IP address, etc. The user identifier is noted by the conversion module and associated with the audio file 320. Other techniques described in "Speech Controlled Services and Devices Using Internet" (referenced above) may also be used.

In step 408 the audio file is broken into any number of audio fragments 330-334 using audio fragmentation module 324. In one embodiment, silence detection system software is used to break the audio file into fragments based upon detecting relative silence between audio fragments. In one example, if about 200 ms of relative silence is detected than the detection system determines that a break should occur. For example, at time equals 10 seconds the system has detected at least about 200 ms of silence so the detection system has broken the audio file into the first fragment 330 and a second fragment 332 that begins at time equals 10 seconds.

The audio file may be broken into fragments of any length and into any number of fragments. Preferably, the audio fragments are long enough to provide context and meaning for a human agent who may listen to the fragments, but not so long that an agent has difficulty verifying the text conversion of such fragments. Further, there is also a trade-off between short and long fragments with respect to comparison module 380 (discussed in more detail below). Although long audio fragments mean long text fragments (fragments 372, for example), a long text fragment increases the likelihood that text fragments 372 will not match and should be sent to a human agent for verification. Shorter text fragments increase the likelihood that a match between fragments 372 will occur and that use of the verification service is not needed. In general, it has been found that audio fragments having a length of about 3-10 seconds perform well in this system. Audio fragments having a length of about 4 to 5 seconds work particularly well.

If no suitable periods of relative silence are detected in a particular portion of the audio file then longer audio fragments will be produced (for example, if background noise masks any silence or pauses). Or, the detection system may introduce an artificial break at times of 10, 15 or 20 seconds (for example) in order to ensure that the audio fragments are not too long.

Output from fragmentation module 324 are individual audio fragments 330-334 including audio markers 336. Each audio fragment is preferably stored in an individual audio file, or, the group of fragments are stored in a larger file with suitable delineations. The audio markers may be incorporated into each audio fragment, or, the audio markers are stored as pairs in a separate file, database or data structure in consecutive order, thus each pair corresponding to each of the consecutive audio fragments 330-334. If the group of audio fragments are stored in a larger file, then the audio markers are stored along with each fragment in the larger file as well.

In step 412 audio file 320 is input into each speech engine 342-346 in parallel. Also input into each speech engine is the previously obtained user identifier that is used by each speech engine to retrieve the appropriate user profile from database 30. In step 416 each speech engine then converts the audio file into a respective text file 352-356. As is known in the art, each text file also includes running time information that indicates when particular phrases or words occur relative to the beginning of the audio file. Thus, for example, a word beginning at time 10 seconds in output text file 352 corresponds to the beginning of the spoken word in audio fragment 332 beginning at time 10 according to markers 336. In this fashion, a unit of text in text file 352 (for example) may be matched up with its spoken form in any of audio fragments 330-334.

Optimally, each of these three text files 352-356 would be exactly the same. Of course, as each speech engine is different and because errors in conversion are to be expected, it is anticipated that each text file 352-356 will be slightly different. Differences will occur because while one speech engine may convert a particular portion of speech into the appropriate text, another engine or engines might not convert correctly. Use of text fragmentation module 360, comparison module 380 and verification service 40 as described below allow for errors to be corrected and for an accurate text result 56 to be produced by system 10.

In step 420 text fragmentation module 360 is used to break up each text file 352-356 into respective sequences of text fragments. For example, text fragments 378 correspond to text file 352. Module 360 inputs audio time markers 336 in order to break up each text file into text fragments that correspond with audio fragments 330-334. For example, because the original audio file has been broken up into fragments corresponding to time periods 0 to 10 seconds, 10 seconds to 14 seconds, 14 seconds to 19 seconds, etc., each text file 352-356 will be broken up into text fragments that correspond to those same time periods. For example, text file 352 is broken into text fragments 378 corresponding to time periods 0 to 10 seconds, 10 seconds to 14 seconds, and 14 seconds to 19 seconds. Each text file is fragmented in the same manner. Thus, a group of text fragments 374 (for example) for a particular time period that are produced using different speech engines each correspond to the exact same audio fragment (for example, 332) from the original audio file. Optimally, each of these text fragments should be the same. But, as a particular speech engine might make an error in conversion, it is possible that these three text fragments are slightly different. The output from module 360 is a series of text fragments 378 (for example) for each speech engine. Groups of text fragments 372-376 are also identified as representing particular audio fragments.

In step 424 comparison module 380 compares each group of text fragments at a time to determine the most accurate text representation for a particular corresponding audio fragment. For example, the group of text fragments 372 each being output by one of the speech engines, and corresponding to the first audio fragment 330, are compared. Generally, a group of text fragments is compared to determine if there is a match, or if a resulting text fragment can be constructed that best represents the corresponding audio fragment. For a given group of text fragments (i.e., group 372, 374 or 376) the output of comparison module 380 would be any one of the text fragments (assuming all three text fragments match), the entire group (e.g., group 374, assuming that the text fragments do not match and that further analysis is needed), or a result text fragment 382 that is a hybrid of each text fragment in a group, where each word or phrase is chosen based upon a majority agreement among the speech engines). Comparison, matching and fragment construction may be performed in any suitable manner. In the hybrid embodiment, a group of text fragments are compared word-by-word using comparison software in module 380. One skilled in the art will understand how to compare text words using software. In this specific embodiment of the present invention three levels are used to perform this comparison.

At a first level, it is determined if all the words in each of the text fragments match each other exactly (i.e. the first word of each text fragment is the same, the second word of each text fragment is the same, etc.). If not, at a second level it is determined if a particular word in the three text fragments is different. If so, it is then determined if a majority of the speech engines agree on that particular word. For example, if the spoken word is "for" and the speech engines have produced the words "for," "four" and "fore" at that particular word location, then it is determined that there is no agreement. But, if two of the engines pick "for" and one of the engines picks "four" then by majority vote it is determined that there is agreement to choose the word "for." Is also possible that two of the engines pick "four" and one of the engines picks "for;" it will still be determined that there is agreement to choose the word "four" even though the correct word is "for." The word picked by majority vote is added to the result text fragment 382 under construction by the comparison module. At this level if a word is the same across all three engines than that word is added to the result text fragment. In other words, for a result text fragment to be constructed and pass level two, each word out of the three text fragments must be agreed upon by at least a majority of the speech engines.

If a particular word out of a group of text fragments is different across all three text fragments (or that word does not receive a majority agreement among the speech engines used) then it is determined that the three text fragments do not match and this is considered a level three situation. In this situation, accuracy (or probability) information is also used to choose the best word in order to construct a result text fragment 382.

As is known in the art, each speech engine also outputs accuracy information along with each text file. The accuracy information is a list of those words, phrases or sentences that the speech engine believes might not be correct, along with a probability as to how accurately the word or phrase represents its spoken counterpart. For example, when transcribing the spoken word "for" a speech engine might indicate that it believes a transcribed output of "for" is 95% accurate and that an alternative of "four" is 60% accurate. In one embodiment, each word or phrase may have a percentage accuracy associated with it. This judgment is based not only on the transcription of the audio file, but also on a grammatical analysis. A speech engine looks at the whole sentence or phrase and checks to see if it makes sense grammatically with the given word. Any accuracy information present in one of the text files is also included with each individual text fragment.

Therefore, in one alternative embodiment, at this third level the comparison module chooses the word from one of the text fragments that has the highest accuracy percentage and this word is added to the result text fragment. Of course, the comparison module may combine any these techniques, use fewer or more levels, or perform comparisons of words and text fragments in different manners, the goal being to most accurately determine a text fragment that best represents the corresponding audio fragment or to determine that human intervention is needed. The result text fragment 382 for this third level thus contains a combination of the words or phrases from each of the text fragments in the group; if none of the words match, the word having the highest accuracy percentage is used.

In step 428 it is determined if any of the fragments match. As discussed above, this could be a level one situation where each of the three text fragments match exactly, or could be a level two situation where certain of the words do not match but at least a majority of the speech engines agree upon a particular word. If there is a match, then in step 432 any one of the text fragments for that group is accepted as the representative text fragment (in a level one situation) or, result text fragment 382 is accepted as the representative text fragment (in a level two situation). Once accepted, conversion module 20 keeps track of the current representative text fragment in order to construct a representative text file that most accurately matches audio file 320. Control then moves to step 468 to process the next group of text fragments.

In step 436 it is then determined that the text fragments do not match, i.e., at least one of the words in each of the text fragments did not receive agreement from at least a majority of the speech engines. In this level three situation, it is realized that further analysis and input is needed before a representative text fragment can be formed that best matches the corresponding audio fragment. No text fragment is accepted by the conversion module at this point, instead, the currently formed result text fragment 382 is identified as the best result so far.

In step 440 the current result text fragment 382 along with its corresponding audio fragment is sent from conversion module 20 over the Internet (or over any suitable communications medium) to verification service 40. The verification service may have any number of agents 204-210. In one embodiment, agents 204-208 are verification agents and agent 210 is an editing agent. Each of agents 204-208 receives the current audio fragment 232 and the current result text fragment 234.

This interface and the associated software running on each agent's computer allows each agent to play the audio fragment over and over in a loop; the agent listens to the audio and determines if the result text fragment they are viewing on their screen is an acceptable match.

In step 444 each agent indicates whether he or she thinks that the result text fragment matches the audio fragment. In one embodiment, this "yes or no" result is transmitted back to conversion module 20 for action. If a majority of the verification agents (in this case, two) agree that there is a match, then in step 448 the conversion module accepts the current result text fragment as a representative text fragment and places that fragment into its appropriate location in the result text 56 that the conversion module is building. Control then moves to step 468 to process the next group of text fragments. If a majority does not agree that there is a match, then in step 452 the conversion module sends audio fragment 232 and result text fragment 382 to editing agent 210. This agent also has a similar user interface as the verification agents but also has the capability to edit the text fragment. The editing agent edits fragment 382 to make it match audio fragment 232, creates edited text fragment 236 and returns the edited text fragment to the conversion module.

In step 460 the conversion module again sends the current audio fragment along with the edited text fragment 236 back to the verification agents. As in steps 444-452 the verification agents again vote "yes or no"; a majority voting yes indicates that the current edited text fragment is accepted by the conversion module, otherwise the edited text fragment is sent to editing agent 210 one last time. Once the editing agent edits the text fragment 236 one last time, this final text fragment (whether edited a second time or not) is accepted by the conversion module as the most accurate representation of the audio fragment. Control then moves to step 468 to process the next group of text fragments.

Of course, the audio and text fragments may be sent to the verification and editing agents any number of times. In this embodiment, each agent will analyze the audio and text fragments a maximum of two times.

Step 468 is a looping construct that returns control to step 424 in order that each group of text fragments (e.g., 372, 374 etc.) may be compared word-for-word by comparison module 380 and verified or edited as needed. Result text fragments that are indicated as matching in step 428 are added to the final text output 56 in appropriate order, while result text fragments that are sent to the verification service are only added to the final text output once verified or edited. In this way, a final, complete text representation of audio file 320 is created by conversion module 20. In step 470 the fragments may be played back to the user as they are accepted and stored within conversion module 20.

Figure 6:
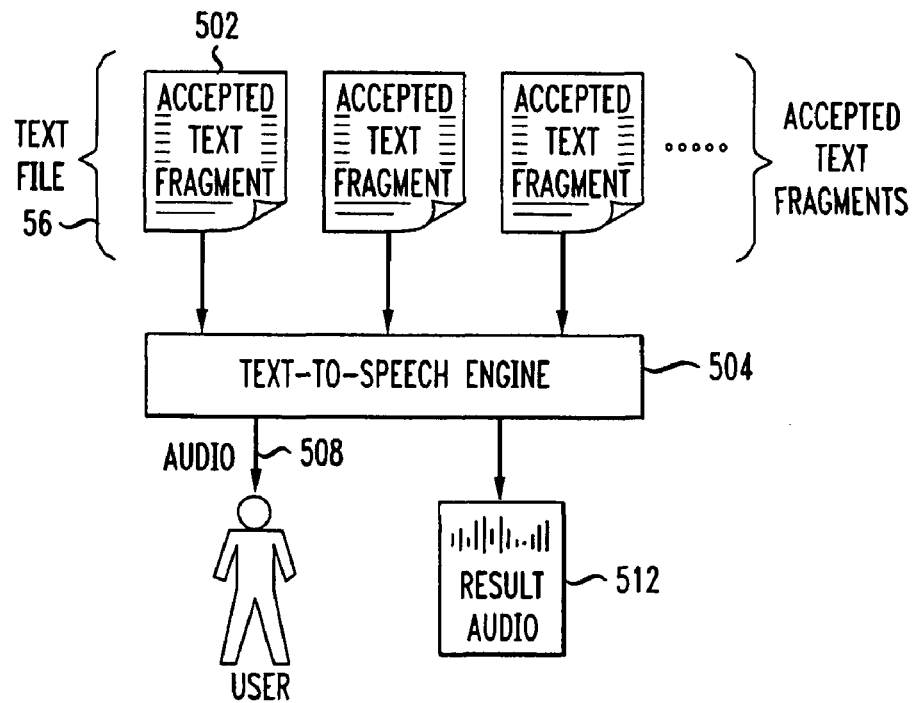
FIG. 6 illustrates accepted text fragments that are formed into a final, complete text file.

FIG. 6 illustrates accepted text fragments that are formed into a final, complete text file 56. As mentioned above, as individual text fragments (e.g., 502) are accepted by conversion module 20 (either because there was a match or because the fragment was either verified or edited) each text fragment may be fed into a text-to-speech engine 504 for playback to a user. Implementation of such an engine 504 may be performed as described in the application entitled "Speech Controlled Services and Devices Using Internet" referenced above. Audio output 508 may be played back directly to user over any suitable communications medium (e.g., over the telephone line by which the user has input the audio information), or, the output may be stored into a result audio file 512 for playback or delivery to the user. File buffering may be used to eliminate gaps between playback of text fragments. In this fashion, the user may receive nearly instantaneous feedback regarding his or her speech that is being transcribed and the user can determine if it is accurate or not.

Figure 7:
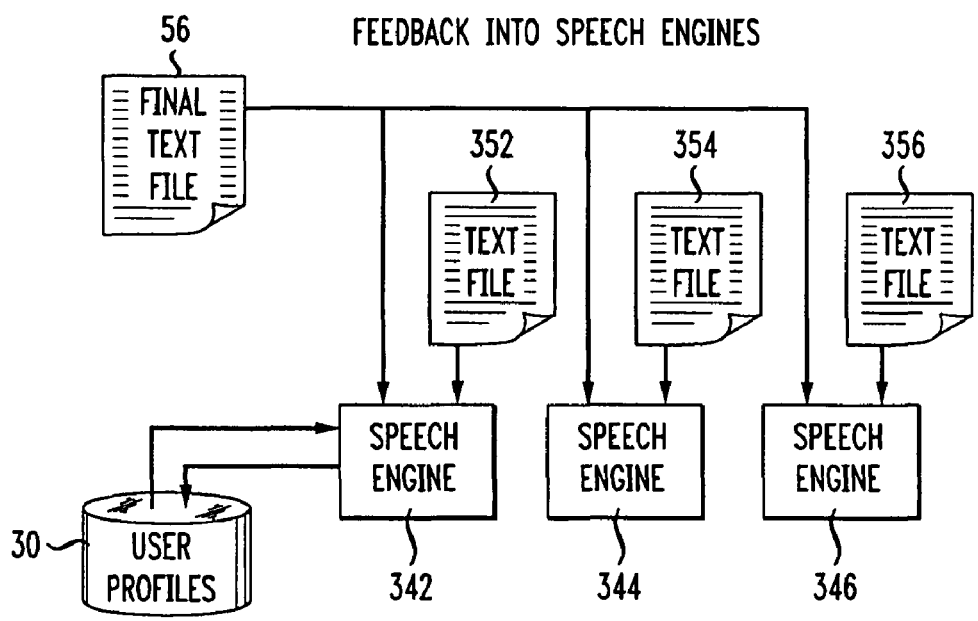
FIG. 7 illustrates the final text file and original text file being both fed back into the speech engines to improve the user profile.

In step 472 the final text output 56 is fed back into each speech engine along with the corresponding original text file produced 352-356 in order that each speech engine will learn and so that each user's profile is expanded and improved upon. For example, FIG. 7 illustrates final text file 56 and original text file 352 being both fed back into the speech engines to improve the user profile. In step 476, the user profile is modified based upon the feedback from each speech engine.

As is known in the art, each speech engine includes a default or baseline profile that characterizes each word or phoneme using a mathematical representation. Each user profile includes such a mathematical representation for those phonemes and words not present in the default profile, or, includes a variance off of the baseline representation for those words present in the default profile. Thus, the way a particular user speaks the word "the" is represented as a mathematical variance in the user's profile from the full mathematical representation of the word "the" in the speech engine default profile. Each user profile is modified by changing a variance for a particular phoneme or word based upon the feedback generated in step 472.

Thus, FIG. 5 has described how a user's speech is transcribed accurately into a text file. In one embodiment of the invention conversion module 20 recognizes when a user is using system 10 for the first time or one of the first few times and adjusts the processing that occurs. For example, if no user profile exists the first time that a user sends speech to the system, conversion module 20 recognizes that no user profile is present and may take steps to ensure that all groups of text fragments are sent to the verification service. Alternatively, the conversion module, realizing that the text fragments may be largely inaccurate, may choose to simply send the audio fragments alone to the verification service and to different agents. The audio fragments are then transcribed by editing agents. Or, the conversion module sends a warning to the verification and editing agents informing them that the received result text fragment may be largely inaccurate because a user profile has not been developed or still in the development stages. As the user profile is developed is anticipated that the text files produced by the speech engines will become more and more accurate and that less and less verification and editing will be needed by the agents. Once a user profile is mature, it is anticipated that transcription by the speech engines will be nearly perfect and that use of the human agents may not be necessary in many situations.

Audio Streaming Embodiment

In an alternative embodiment, speech 52 input to the conversion module 20 need not be saved first into an audio file 320. Rather, the incoming speech 52 is streamed directly in real time into each of the speech engines 342-346 and into audio fragmentation module 324 in parallel to speed up the process. As soon as an audio fragment 330-334 is ready it is delivered to the next available agent for verification and/or editing. If multiple agents are used, the next available audio fragment is sent to numerous agents in parallel for verification and editing. When a subsequent audio fragment is available it is sent to a different agent or a different cell of agents so that each audio fragment is being processed by different agents in parallel in order to speed up the transcription process. Once comparison module 380 has produced the next text fragment (or result text fragment) this fragment is delivered to the appropriate agent or agents who have received the corresponding audio fragment. In this fashion, there is minimal delay in the processing of these fragments and fragments are processed in parallel and in real time as they are received.

Further, each agent is able to listen to a previous audio fragment (or a subsequent audio fragment) in case words are chopped off or if the context is not clear. One technique is to always deliver the previous audio fragment and the subsequent audio fragment to a particular agent, or, an agent can request a previous or subsequent audio fragment by clicking an appropriate symbol on his screen which then downloads that audio fragment from the conversion module over the Internet.

In a variation on this embodiment, speech 52 is streamed directly into fragmentation module 324, and as the audio fragments are produced they are each delivered directly, in real time to an agent or a cell of agents. Subsequent audio fragments are delivered to different agents so that transcription occurs in parallel. Thus, the first words spoken by a user are played to a transcription agent in practically real time with only a short electronic delay between what is spoken in what is heard. The transcription agents are performing the actual transcription from speech to text instead of relying upon a speech engine. In this fashion, even short commands can be transcribed, edited or verified in real-time. If the command is short enough and clear enough, use of the speech engines, fragmentation module, and comparison module are not needed. The command is verified and edited by the agents and then delivered as text file output 56.

Overlapping Fragment Embodiment

In this embodiment, the audio fragments are not necessarily discrete fragments that do not overlap. For example, a conscious choice is made that all audio fragments will be approximately 10 seconds (or any other suitable time period). Fragmentation module 324 then fragments the incoming audio according to elapsed time as follows. Fragment 1 lasts from 0-10 seconds, fragment 2 lasts from 5-15 seconds, fragment 3 lasts from 10-20 seconds, et cetera. Thus, each audio fragment overlaps the previous fragment by 5 seconds and overlaps the subsequent fragment by 5 seconds. Of course, longer or shorter overlaps may be used, for example, each fragment may only overlap another fragment by 1 second. Longer overlaps have the potential to produce more accurate results because more agents are looking at the same section of audio, but more agents are required and processing time can be longer. Shorter overlaps require fewer agents. If no overlap is used the potential for errors at the boundaries of the audio fragments is increased because words may be chopped off and may not be understood by an agent.

If overlap is used, a splicing module is used to splice together the accepted text fragments 502 into a final text file 56. For example, consider the original speech "The quick brown fox jumps over the lazy dog." If no overlap is used, that sentence might be broken up into the three fragments "the quick brown fox," "jumps over," and "the lazy dog." If an overlap of a relatively short time is used, that sentence might be broken into the four fragments "the quick brown fox," "brown fox jumps over," "jumps over the," and "the lazy dog." These four fragments illustrate that each fragment overlaps slightly with the proceeding and subsequent fragment (except for the first and last fragments). These four fragments represent the final accepted text fragments 502 that have been compared and verified by the agents.

Normally, these fragments may simply be concatenated together (as in the case of the first example with three non-overlapping fragments) to form the final text file 56. But, since overlap is used, these four fragments are spliced together by a software splicing module to remove the duplicative words. For example, the words "brown fox" are removed from the first fragment, the words "jumps over" are removed from the second fragment and the word "the" is removed from the third fragment. Alternatively, these duplicative words could also be removed from the subsequent fragment. Basically, the splicing module compares the end of one fragment with the beginning of the next fragment, find duplicative words (for example, "brown fox" in the first and second fragments), and then removes one set of the duplicative words. One of skill in the art will understand how to write computer code to compare strings of text for duplicative words and then remove those duplicates. Once the duplicative words are removed, the final accepted text fragments may then be concatenated together to form the final text file or may be delivered to engine 504 for conversion to speech as previously described.

Alternative Matching Embodiment

In an alternative embodiment, matching of text fragments (whether the fragments are output by the speech engines, step 428, or the fragments are viewed by the verification agents, step 444) is performed as follows. For one, it is realize that two speech engines or two agents might both correctly transcribe a certain word or phrase but might write it differently simply because the words are homophones. For example the pairs "4"/"four", 12%/12 percent and "I am"/"I'm" are homophones. In other words, if the word or phrase is spoken, each of the corresponding written words is generally viewed as being a correct transcription of the spoken word. Another example is calendar dates that may be different in many different formats, although each format refers to the same spoken date. In general, these word pairs or phrase pairs refer to words or phrases that sound the same when they are spoken but might be spelled or formatted differently when written. Thus, software that literally compares words might not indicate that a match has occurred when two homophones are encountered from two different engines or agents. It would be desirable for the matching software to indicate a match when homophones are encountered and to select the appropriate word.

Therefore, in this alternative embodiment, these matching steps use an equivalence table that simply lists columns of words or phrases that are homophones. Generally, two columns would be enough, but there may be multiple columns where many words or phrases sound the same but are written differently. One reads across the table in a row to view a set of homophones that sound the same but read differently. If the table has 100 entries for homophones, then there would be 100 rows. For example, the table may have in its first row the word "I'm" in the first column and the words "I am" in the second column. In one embodiment, an indicator is used for each row to indicate which word should be selected as part of the text fragment if homophones are encountered in the fragments. For example, in a final column a single digit indicates which column of the row contains the word to be used. For example, the digit "1" in the third column of the first row indicates that the word "I'm" should be used in the final text fragment. Other methods of indicating which word to be used may also be used.

Use of the equivalence table allows a match to occur if there is an exact match or if the words appear in the same row of the table. Date and time entries (in fact, any numerical or formal notation) can match no matter the format used, and can be standardized to a format desired by the overall service.

It is recognized in the field of linguistics that there is some confusion over terminology. We herein define the term "homophones" to mean pairs or groups of words as shown in the above examples that sound the same, have the same (or generally the same) meaning, but are spelled, formatted or presented differently. It is also possible that homophones refer not only to single words that sound the same, have the same meaning and are spelled differently, but also to groups of words having these characteristics. Further, a pair of homophones may include a single word that sounds the same as a group of words or short phrase. It is also acknowledged that some experts may refer to the above examples as actually groups of synonyms (same meaning and spelled differently) that sound the same. One of skill in the art will understand our use of the term "homophones" based upon the examples and description provided above.

Alternative Hybrid Fragment Embodiment

Above, steps 428 and 444 describe how the outputs of the speech engines are compared or how the agents compare text fragments to see if they match. In a preferred embodiment, a hybrid text fragment (also referred to as result text fragment 382) is selected. If the hybrid text fragment is selected based upon the outputs of the speech engines, then this fragment is delivered to the agents. If the fragment is selected based upon a vote of the agents, then this hybrid text fragment may be delivered to the end user for review as described below. In this embodiment accuracy or probability information is not necessarily included with the fragment or used to select words or phrases in the fragment.

The use of a hybrid text fragment improves the accuracy of the transcription (based upon the outputs of many agents or speech engines) because the mistakes made by different human agents or the errors made by different speech engines will not typically be identical. Therefore, is unlikely that a majority of the speech engines or the agents will each choose an incorrect word in a text fragment, thus creating an incorrect text fragment. It is far more likely that only a single engine or agent will get a given word wrong, while a majority of the engines or agents agree upon the correct word, thus creating a correct text fragment. In other words, the word that one agent gets wrong will likely not be the same word that another agent gets wrong. This technique ensures that a single mistake-prone agent will not significantly reduce the accuracy of the service. An agent only selects, types or verifies a word if he or she fully understands it. This implementation uses a transcription agent and two editing agents. A hybrid is created using the outputs of the transcription agent and the editing agents. The hybrid text fragment is then sent for verification.

In this implementation the word or phrase chosen by a minority of the speech engines or agents is not deleted from the fragment or ignored, it is also included in the hybrid text fragment but it is highlighted to indicate that it is the minority choice. One technique is to place the minority choice in parentheses immediately after the majority choice. Further, each agent is allowed to pass on deciphering a particular word or phrase if he or she cannot confidently determine its meaning. For example, when listening to the audio and editing or verifying a fragment, if an agent is not confident that he or she knows the correct word to insert or is not confident to say that a certain word is the correct word, he or she indicates to skip that word or phrase, and that word or phrase is highlighted. One technique is to indicate a skipped word by using a blank line.

For example, the output or verified phrase "the difference (defense) is important" indicates that a majority of engines or agents chose the word "difference" while a minority chose the word "defense." This highlighting is useful for downstream agents as they will understand what a minority of speech engines chose, and is useful for an end user as they will understand what a minority of agents chose. The output or verified phrase "the _____ (defense) is important" indicates that a majority of engines or agents chose not to confirm a particular word (its location indicated by the blank line) while a minority chose the word "defense." If each of three speech engines or agents choose a different word in a particular location in the fragment, then each of the three words may be highlighted thus: "the (difference) (defense) (distance) is important." The basic idea is that an agent or an end user is apprised of which words or phrases were chosen by a majority of the engines or agents and which were not.

This technique may also be used to fill in missing words or to remove extra, incorrect words, as opposed to selecting between existing words. For example, if one engine outputs the phrase "this a" while two engines output the phrase "this is a," then a hybrid text fragment would be created that is "this is a," thus adding a word. Alternatively, the phrase would appear "this is( ) a," thus indicating that a minority believed no extra word is needed. Or, if one engine outputs the phrase "that at action" while two engines output the phrase "that action," then a hybrid text fragment would be created that is "that action," thus deleting a word. Alternatively, the phrase would appear "that ((at)) action," thus indicating that a minority believed an extra word should be present.

FIG. 2 illustrates numerous ways to deliver text file 56 to an end user. Use of highlighting in this fashion is useful when a transcript of the audio is delivered to the end user or to the user who has requested the service. In one embodiment, text file 56 is delivered as an e-mail message over the Internet to a user's computer 111 via e-mail server 110. Or, the text file is delivered to a mobile telephone or similar device. In a preferred embodiment, the text file is delivered to, and is available from, a web site using technology such as "webmail." For example, FIG. 2 shows that the text file may be uploaded over the Internet to a web server 112 or may be placed directly on to a web server 114. The audio file 320 and the audio fragments 330-334 are also transferred to or uploaded to the same web server. The user at computer 111 may now access the text file, the original audio file, or any of the individual audio fragments via the Internet. Preferably, these files and fragments are located on the web server and need not be downloaded to the user's computer.

In one embodiment, the user receives an e-mail message containing a link to the text file on a particular web site. By choosing that link the user is directed to that web site via his browser and is able to read the resultant text file. Assuming the file is correct, the user may then do nothing (if reading the file is enough), may download the text file, may send the text file to someone else via an e-mail message, or take another action. But, if certain words are highlighted as above because the engines or agents could not come to agreement on a particular word, then the user has further options. By clicking on any portion of the file or text fragment, the audio fragment corresponding to that text fragment is played back to the user on his or her computer. Thus, any suspect portion or text fragment that has highlighted words can be played back by the user. Because the user likely understands the context, it may not be necessary for the user to play back the audio fragment to understand the exact meaning. Once the user understands the meaning, he or she may choose the correct word and edit the text file. Because only one audio fragment at a time need be played, it may be done quite rapidly instead of downloading the entire audio file. Further, because the number of errors will be small, and because the user will often understand the meaning without needing to hear the audio fragment, the necessity of playing the audio fragment will be rare.

Computer System Embodiment

Figure 8A:
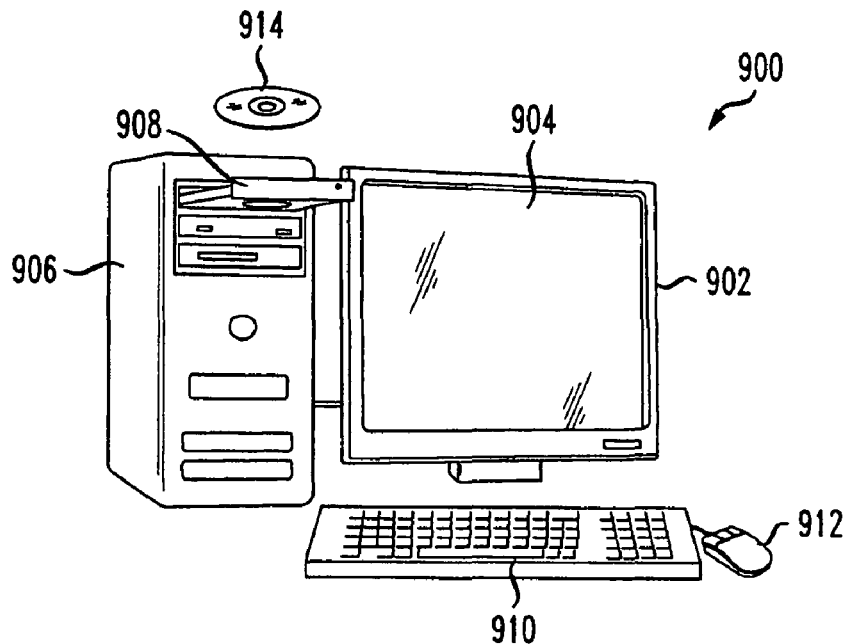
FIGS. 8A and 8B illustrate a computer system suitable for implementing embodiments of the present invention.
Figure 8B:
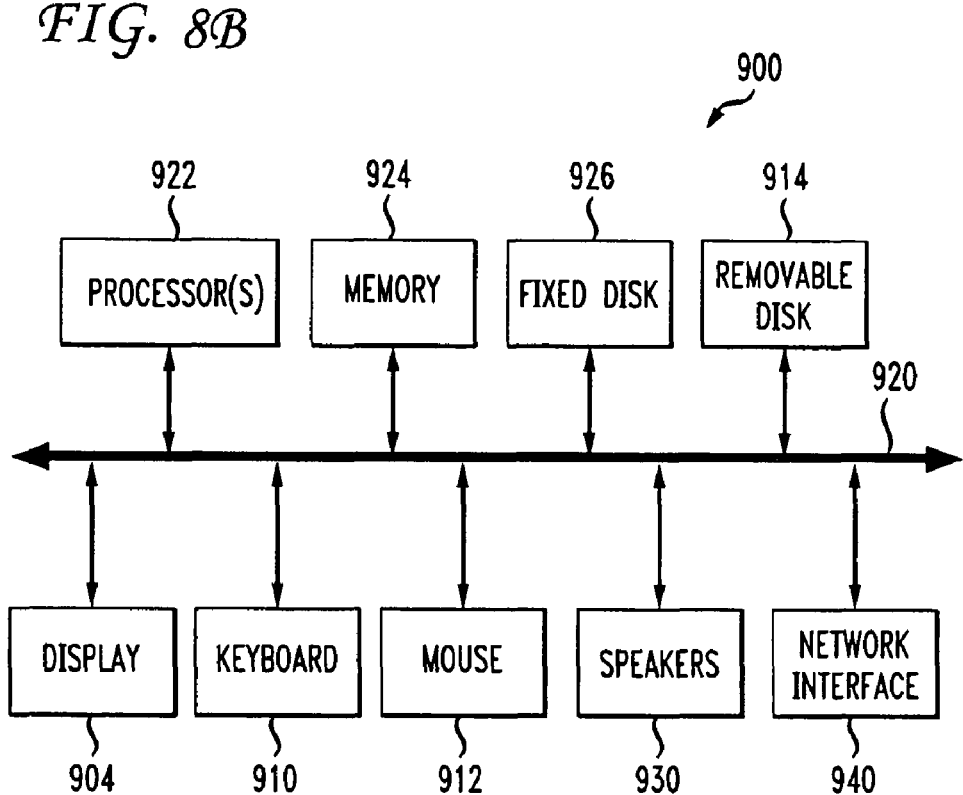

FIGS. 8A and 8B illustrate a computer system 900 suitable for implementing embodiments of the present invention. FIG. 8A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 8B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of converting speech into text comprising:
    receiving audio information representing speech of a person;
    fragmenting said audio information into a plurality of overlapping audio fragments and determining time boundaries for each audio fragment, said overlapping creating duplicative information;
    delivering said audio information to a plurality of speech-to-text conversion engines;
    converting said audio information by said conversion engines into a plurality of text files, each conversion engine producing one of said text files;
    using said previously determined time boundaries to fragment each of said text files into a plurality of text fragments, each of said text fragments corresponding to one of said plurality of audio fragments;
    comparing said plurality of text fragments a set at a time, each set corresponding to a single one of said audio fragments;
    outputting a result text fragment for each of said sets, each of said result text fragments corresponding to a single one of said audio fragments; and
    splicing said result text fragments into a text file that represents said audio information by deleting said duplicative information.

2. A method as recited in claim 1 further comprising:
    delivering said result text fragment to a plurality of human agents over the Internet; and
    receiving an edited text fragment from said plurality of human agents, said edited text fragment being a better representation of said single one of said audio fragments.

3. A method as recited in claim 2 further comprising:
    creating said edited text fragment by selecting each word of said edited text fragment that is agreed upon by a majority of the human agents.

4. A method as recited in claim 1 further comprising:
    creating said result text fragment by using a hybrid of said first set of said text fragments.

5. A method as recited in claim 1 further comprising:
    comparing said plurality of text fragments a set at a time, each set corresponding to a single one of said audio fragments;
    outputting a result text fragment for each of said sets, each of said result text fragments corresponding to a single one of said audio fragments; and
    concatenating said result text fragments into a text file that represents said audio information.

6. A method as recited in claim 1 further comprising:
fragmenting said audio information by detecting periods of silence between said audio fragments, each of said audio fragments not overlapping with other audio fragments.

7. A system for converting speech into text comprising:
an audio fragmentation module that receives audio information representing speech of a person and fragments said audio information into a plurality of overlapping audio fragments using time boundaries for each audio fragment, said overlapping creating duplicative information;
a plurality of speech-to-text conversion engines arranged to convert said audio information by said conversion engines into a plurality of text files, each conversion engine producing one of said text files;
a text fragmentation module that fragments each of said text files into a plurality of text fragments using said previously determined time boundaries, each of said text fragments corresponding to one of said plurality of audio fragments;
a comparison module that compares said plurality of text fragments a set at a time, each set corresponding to a single one of said audio fragments;
a result text fragment output by said comparison module for each of said sets, each of said result text fragments corresponding to a single one of said audio fragments; and
a text file that represents said audio information, said text file being produced by splicing said result text fragments in order to delete said duplicative information.

8. A system as recited in claim 7 further comprising:
a remote verification service including a plurality of human agents to which said result text fragment is delivered over the Internet; and
an edited text fragment produced by said plurality of human agents, said edited text fragment being a better representation of said single one of said audio fragments.

9. A method as recited in claim 8 wherein said edited text fragment is created by selecting each word of said edited text fragment that is agreed upon by a majority of the human agents.

10. A system as recited in claim 7 wherein said result text fragment is created by using a hybrid of said first set of said text fragments.

11. A system as recited in claim 7 wherein said comparison module compares said plurality of text fragments a set at a time, each set corresponding to a single one of said audio fragments, said system further comprising:
a result text fragment output by said comparison module for each of said sets, each of said result text fragments corresponding to a single one of said audio fragments; and
a text file that represents said audio information, said text file being the concatenation of said result text fragments output by said comparison module for each of said sets.

12. A system as recited in claim 7 wherein said audio fragmentation module fragments said audio information by detecting periods of silence between said audio fragments, each of said audio fragments not overlapping with other audio fragments.

13. A method of converting speech into text comprising:
receiving audio information representing speech of a person;
delivering said audio information to a plurality of speech-to-text conversion engines;
converting said audio information by said conversion engines into a plurality of text files, each conversion engine producing one of said text files;
fragmenting each of said text files into a plurality of overlapping text fragments, each of said text files being fragmented according to a set of previously determined time boundaries, said set of boundaries being the same for each of said text files, said overlapping creating duplicative information;
comparing said plurality of text fragments a set at a time, each set corresponding to a single portion of said audio information;
outputting a hybrid text fragment for each of said sets, each of said hybrid text fragments corresponding to a distinct portion of said audio information; and
concatenating said hybrid text fragments into a text file that represents said audio information by deleting said duplicative information.

14. A method as recited in claim 13 further comprising:
creating said hybrid text fragment by selecting words from said group of text fragments that are agreed upon by a majority of said conversion engines.

15. A method as recited in claim 13 further comprising:
creating said hybrid text fragment by using accuracy information from said text fragments of said group of corresponding text fragments.

16. A method as recited in claim 13 further comprising:
creating said hybrid text fragment by using an equivalence table.

17. A method as recited in claim 13 wherein said step of creating a hybrid text fragment further comprises:
determining that a set of homophones exist between said group of text fragments; and
choosing one of said homophones as the correct representation in said hybrid text fragment.

18. A method as recited in claim 17 further comprising:
using an equivalence table to perform said determining and choosing.

19. A method as recited in claim 13 further comprising:
creating said hybrid text fragment by comparing said group of text fragments on a word-by-word or phrase-by-phrase basis.

* * * * *